United States Patent
Okada et al.

(10) Patent No.: US 11,138,450 B2
(45) Date of Patent: Oct. 5, 2021

(54) IMAGE PROCESSING DEVICE AND IMAGE PROCESSING METHOD

(71) Applicant: DENSO TEN Limited, Kobe (JP)

(72) Inventors: Yasutaka Okada, Kobe (JP); Hiroaki Sano, Kobe (JP); Tetsuo Yamamoto, Kobe (JP); Atsushi Yoshihara, Kobe (JP); Jun Kanetake, Kawasaki (JP); Ryo Yoshimura, Fukuoka (JP); Tomoki Shidori, Kobe (JP)

(73) Assignee: DENSO TEN Limited, Kobe (JP)

( * ) Notice: Subject to any disclaimer, the term of this patent is extended or adjusted under 35 U.S.C. 154(b) by 204 days.

(21) Appl. No.: 16/574,499

(22) Filed: Sep. 18, 2019

(65) Prior Publication Data
US 2020/0193188 A1    Jun. 18, 2020

(30) Foreign Application Priority Data

Dec. 14, 2018  (JP) .............................. JP2018-234801

(51) Int. Cl.
*G06K 9/00* (2006.01)
*G06K 9/46* (2006.01)
*G06K 9/32* (2006.01)

(52) U.S. Cl.
CPC ..... *G06K 9/00812* (2013.01); *G06K 9/00456* (2013.01); *G06K 9/00463* (2013.01); *G06K 9/3233* (2013.01); *G06K 9/4628* (2013.01); *G06K 9/4676* (2013.01)

(58) Field of Classification Search
CPC ........... G06K 9/00456; G06K 9/00463; G06K 9/00812; G06K 9/3233; G06K 9/4628; G06K 9/4676; G06T 7/13; G06T 2207/30264

USPC ................................................. 382/190, 226
See application file for complete search history.

(56) References Cited

U.S. PATENT DOCUMENTS

| 9,361,529 | B2 | 6/2016 | Ryu et al. |
| 9,536,155 | B2 | 1/2017 | Takemae |
| 9,721,460 | B2 | 8/2017 | Takemura et al. |
| 10,311,731 | B1 | 6/2019 | Li et al. |

(Continued)

FOREIGN PATENT DOCUMENTS

| CN | 203318408 U | 12/2013 |
| CN | 102834309 B | 12/2016 |

(Continued)

OTHER PUBLICATIONS

Nov. 23, 2020 Office Action issued in U.S. Appl. No. 16/574,462.
(Continued)

*Primary Examiner* — Daniel G Mariam
(74) *Attorney, Agent, or Firm* — Oliff PLC (57) ABSTRACT

An image processing device includes: an extraction unit configured to extract at least one edge line based on image data obtained by an imaging device configured to capture a surrounding of a vehicle; a giving unit configured to give a priority to each of the at least one edge line; a registration unit configured to register the at least one edge line in descending order of the priority while limiting a number of registration of the at least one edge line to an upper limit or smaller of the number of registration; and a detection unit configured to detect a parking space, based on the at least one edge line registered.

19 Claims, 8 Drawing Sheets

(56) References Cited

U.S. PATENT DOCUMENTS

| | | |
|---|---|---|
| 10,373,226 B1 | 8/2019 | Russell et al. |
| 2002/0087253 A1 | 7/2002 | Jeon |
| 2003/0128106 A1 | 7/2003 | Ross |
| 2003/0222983 A1 | 12/2003 | Nobori et al. |
| 2004/0254720 A1 | 12/2004 | Tanaka et al. |
| 2006/0080035 A1 | 4/2006 | Daubert et al. |
| 2008/0109120 A1 | 5/2008 | Sawamoto |
| 2009/0243889 A1 | 10/2009 | Buhr et al. |
| 2009/0278709 A1 | 11/2009 | Endo et al. |
| 2010/0049402 A1 | 2/2010 | Tanaka |
| 2010/0195901 A1 | 8/2010 | Andrus et al. |
| 2010/0318467 A1 | 12/2010 | Porter et al. |
| 2011/0006917 A1 | 1/2011 | Taniguchi et al. |
| 2013/0027557 A1 | 1/2013 | Hirai et al. |
| 2013/0266188 A1 | 10/2013 | Bulan et al. |
| 2014/0355822 A1 | 12/2014 | Choi et al. |
| 2015/0254981 A1 | 9/2015 | Tachibana et al. |
| 2015/0294163 A1 | 10/2015 | Sakamoto |
| 2015/0317526 A1 | 11/2015 | Muramatsu et al. |
| 2015/0344028 A1 | 12/2015 | Gieseke et al. |
| 2016/0039409 A1 | 2/2016 | Hayakawa et al. |
| 2016/0093214 A1 | 3/2016 | Wu et al. |
| 2016/0107689 A1 | 4/2016 | Lee |
| 2016/0272244 A1 | 9/2016 | Imai et al. |
| 2016/0304088 A1 | 10/2016 | Barth |
| 2017/0032681 A1* | 2/2017 | Tomozawa ............. G08G 1/168 |
| 2017/0085790 A1 | 3/2017 | Bohn |
| 2018/0012082 A1 | 1/2018 | Satazoda et al. |
| 2018/0095474 A1 | 4/2018 | Batur et al. |
| 2018/0099661 A1 | 4/2018 | Bae et al. |
| 2018/0162446 A1 | 6/2018 | Mikuriya et al. |
| 2018/0215413 A1 | 8/2018 | Inagaki |
| 2018/0307919 A1 | 10/2018 | Hayakawa |
| 2018/0307922 A1 | 10/2018 | Yoon et al. |
| 2018/0345955 A1 | 12/2018 | Kim et al. |
| 2019/0073902 A1 | 3/2019 | Indoh et al. |
| 2019/0075255 A1 | 3/2019 | Matsumoto et al. |
| 2019/0094871 A1 | 3/2019 | Sugano |
| 2019/0370572 A1 | 12/2019 | Nagpal et al. |
| 2020/0062242 A1 | 2/2020 | Hayakawa |
| 2020/0074192 A1 | 3/2020 | Ogata et al. |
| 2020/0104613 A1 | 4/2020 | Hirai |
| 2020/0117927 A1 | 4/2020 | Oba |
| 2020/0118310 A1 | 4/2020 | Matsumoto et al. |
| 2020/0175634 A1 | 6/2020 | Aggarwala et al. |
| 2020/0193643 A1 | 6/2020 | Hess et al. |
| 2020/0398827 A1 | 12/2020 | Nara |
| 2021/0180954 A1 | 6/2021 | Hiyokawa et al. |

FOREIGN PATENT DOCUMENTS

| | | | |
|---|---|---|---|
| JP | 2003-032669 A | 1/2003 | |
| JP | 2005-300294 A | 10/2005 | |
| JP | 2009-288867 A | 12/2009 | |
| JP | 2012-176641 A | 9/2012 | |
| JP | 2012-221375 A | 11/2012 | |
| JP | 2013-001366 A | 1/2013 | |
| JP | 2014-106731 A | 6/2014 | |
| JP | 2014-146182 A | 8/2014 | |
| JP | 2015-104982 A | 6/2015 | |
| JP | 2015-185138 A | 10/2015 | |
| JP | 2015219774 A | 12/2015 | |
| JP | 2017-021747 A | 1/2017 | |
| JP | 2017-076275 A | 4/2017 | |
| JP | 2017-087758 A | 5/2017 | |
| JP | 2018-136695 A | 8/2018 | |
| JP | 2018-180941 A | 11/2018 | |
| KR | 10-2017-0102192 A | 9/2017 | |
| WO | 03058163 A1 | 7/2003 | |
| WO | 2005/081941 A2 | 9/2005 | |
| WO | 2010116922 A1 | 10/2010 | |
| WO | 2014/084118 A1 | 6/2014 | |
| WO | 2017/068699 A1 | 4/2017 | |

OTHER PUBLICATIONS

K Choeychuen, "Available car parking space detection from webcam by using adaptive mixing features," 2012 Ninth International Joint Conference on Computer Science and Software Engineering (JCSSE) (Year: 2012).

Nov. 30, 2020 Office Action issued in U.S. Appl. No. 16/574,503.

Suhr et al., "Automatic Parking Space Detection and Tracking for Underground and Indoor Environments." IEEE Transactions on Industrial Electronics. (Year: 2016).

K Hamada et al., "Surround View Based Parking Lot Detection and Tracking." IEEE Intelligent Vehicles Symposium. (Year 2015) pp. 1106-1111.

Dec. 3, 2020 Office Action issued in U.S. Appl. No. 16/574,393.

J Suhr et al., "A Universal Vacant Parking Slot Recognition System Using Sensors Mounted on Off-the-Shelf Vehicles." (Year 2018).

Nov. 12, 2020 Notice of Allowance issued in U.S. Appl. No. 16/574,598.

U.S. Appl. No. 16/574,395, filed Sep. 18, 2019 in the name of Yasutaka Okada et al.

U.S. Appl. No. 16/574,507, filed Sep. 18, 2019 in the name of Yasutaka Okada et al.

U.S. Appl. No. 16/574,462, filed Sep. 18, 2019 in the name of Yasutaka Okada et al.

U.S. Appl. No. 16/574,422, filed Sep. 18, 2019 in the name of Yasutaka Okada et al.

U.S. Appl. No. 16/574,598, filed Sep. 18, 2019 in the name of Yasutaka Okada et al.

U.S. Appl. No. 16/574,503, filed Sep. 18, 2019 in the name of Yasutaka Okada et al.

U.S. Appl. No. 16/574,529, filed Sep. 18, 2019 in the name of Yasutaka Okada et al.

U.S. Appl. No. 16/574,546, filed Sep. 18, 2019 in the name of Yasutaka Okada et al.

U.S. Appl. No. 16/574,393, filed Sep. 18, 2019 in the name of Yasutaka Okada et al.

U.S. Appl. No. 16/574,391, filed Sep. 18, 2019 in the name of Yasutaka Okada et al.

U.S. Appl. No. 16/574,450, filed Sep. 18, 2019 in the name of Yasutaka Okada et al.

U.S. Appl. No. 16/574,516, filed Sep. 18, 2019 in the name of Yasutaka Okada et al.

Reinhard et al., Photographic Tone Reproduction for Digital Images (2002), ACM Transactions on Graphics, 2, 4, 217-236 (Year: 2002).

Feb. 2, 2021 Office Action issued in U.S. Appl. No. 16/574,422.

Sep. 29, 2020 Office Action issued in U.S. Appl. No. 16/574,391.

Mar. 30, 2021 Office Action issued in U.S. Appl. No. 16/574,516.

Mar. 19, 2021 Office Action issued in U.S. Appl. No. 16/574,462.

Mar. 19, 2021 Office Action issued in U.S. Appl. No. 16/574,503.

Mar. 25, 2021 Office Action issued in U.S. Appl. No. 16/574,391.

Apr. 9, 2021 Office Action issued in U.S. Appl. No. 16/574,393.

Apr. 6, 2021 Office Action issued in U.S. Appl. No. 16/574,507.

Jun. 30, 2020 Notice of Allowance issued in U.S. Appl. No. 16/574,546.

Aug. 3, 2020 Office Action issued in U.S. Appl. No. 16/574,598.

May 19, 2021 Office Action issued in U.S. Appl. No. 16/574,395.

Jul. 20, 2021 Notice of Allowance issued in U.S. Appl. No. 16/574,507.

* cited by examiner

| | CONDITIONS |
|---|---|
| RANK 3 | LENGTH OF EDGE LINE IS EQUAL TO OR GREATER THAN FIRST PREDETERMINED LENGTH |
| RANK 2 | LENGTH OF EDGE LINE IS SMALLER THAN FIRST PREDETERMINED LENGTH AND IS EQUAL TO OR GREATER THAN SECOND PREDETERMINED LENGTH, OR EDGE STRENGTH OF EDGE LINE IS EQUAL TO OR GREATER THAN SECOND PREDETERMINED STRENGTH |
| RANK 1 | LENGTH OF EDGE LINE IS SMALLER THAN SECOND PREDETERMINED LENGTH AND IS EQUAL TO OR GREATER THAN THIRD PREDETERMINED LENGTH, AND EDGE STRENGTH OF EDGE LINE IS SMALLER THAN SECOND PREDETERMINED STRENGTH |
| RANK 0 | LENGTH OF EDGE LINE IS SMALLER THAN THIRD PREDETERMINED LENGTH, AND EDGE STRENGTH OF EDGE LINE IS SMALLER THAN SECOND PREDETERMINED STRENGTH |

IMAGE PROCESSING DEVICE AND IMAGE PROCESSING METHOD

CROSS-REFERENCE TO RELATED APPLICATIONS

This application is based upon and claims the benefit of priority from prior Japanese patent application No. 2018-234801, filed on Dec. 14, 2018, the entire contents of which are incorporated herein by reference.

BACKGROUND

Technical Field

The present disclosure relates to an image processing device and an image processing method.

Related Art

In the related art, an image processing device configured to extract edge lines on the basis of image data obtained by capturing a surrounding of a vehicle and to detect a parking space is known (for example, refer to JP-A-2015-104982).

SUMMARY

However, in the related art, when many edge lines are extracted, processing time in which the parking space is to be detected is prolonged, so that detection time of the parking space may be prolonged.

The present disclosure has been made in view of the above situation, and an object thereof is to provide an image processing device and an image processing method capable of shortening detection time of a parking space.

According to an aspect of the present disclosure, there is provided an image processing device including: an extraction unit configured to extract at least one edge line based on image data obtained by an imaging device configured to capture a surrounding of a vehicle; a giving unit configured to give a priority to each of the at least one edge line; a registration unit configured to register the at least one edge line in descending order of the priority while limiting a number of registration of the at least one edge line to an upper limit or smaller of the number of registration; and a detection unit configured to detect a parking space, based on the at least one edge line registered.

According to the aspect of the present disclosure, it may be possible to shorten the detection time of the parking space.

BRIEF DESCRIPTION OF DRAWINGS

Exemplary embodiment(s) of the present invention will be described in detail based on the following figures, wherein.

DETAILED DESCRIPTION

Hereinbelow, the image processing device and the image processing method of exemplary embodiments will be described in detail with reference to the accompanying drawings. In the meantime, the present disclosure is not limited to the exemplary embodiments.

First Exemplary Embodiment

Figure 1A:
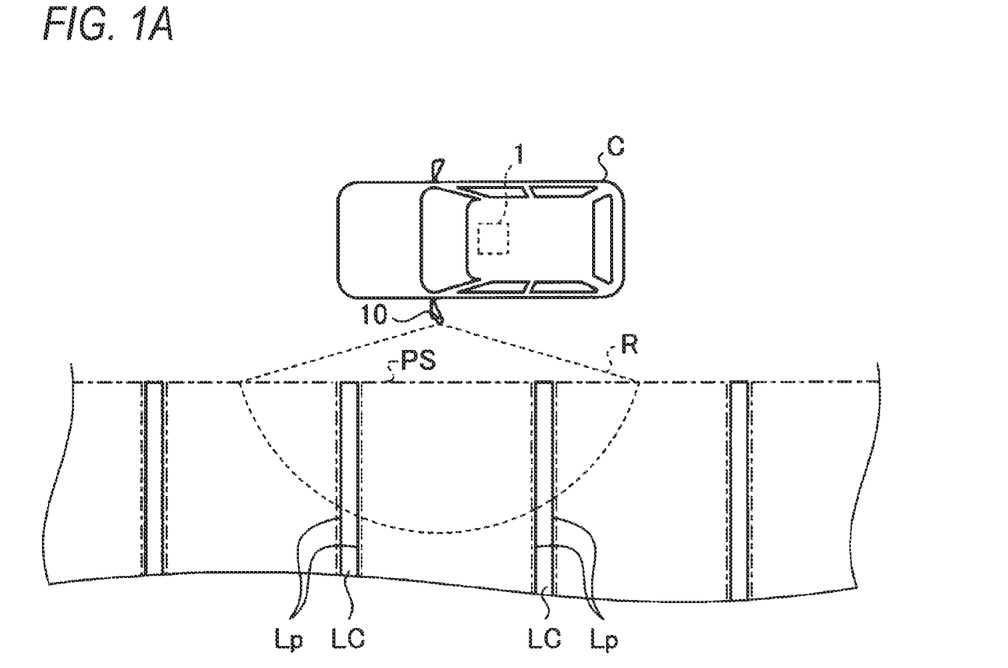
FIG. 1A depicts an example in which an image processing device is mounted.
Figure 1B:
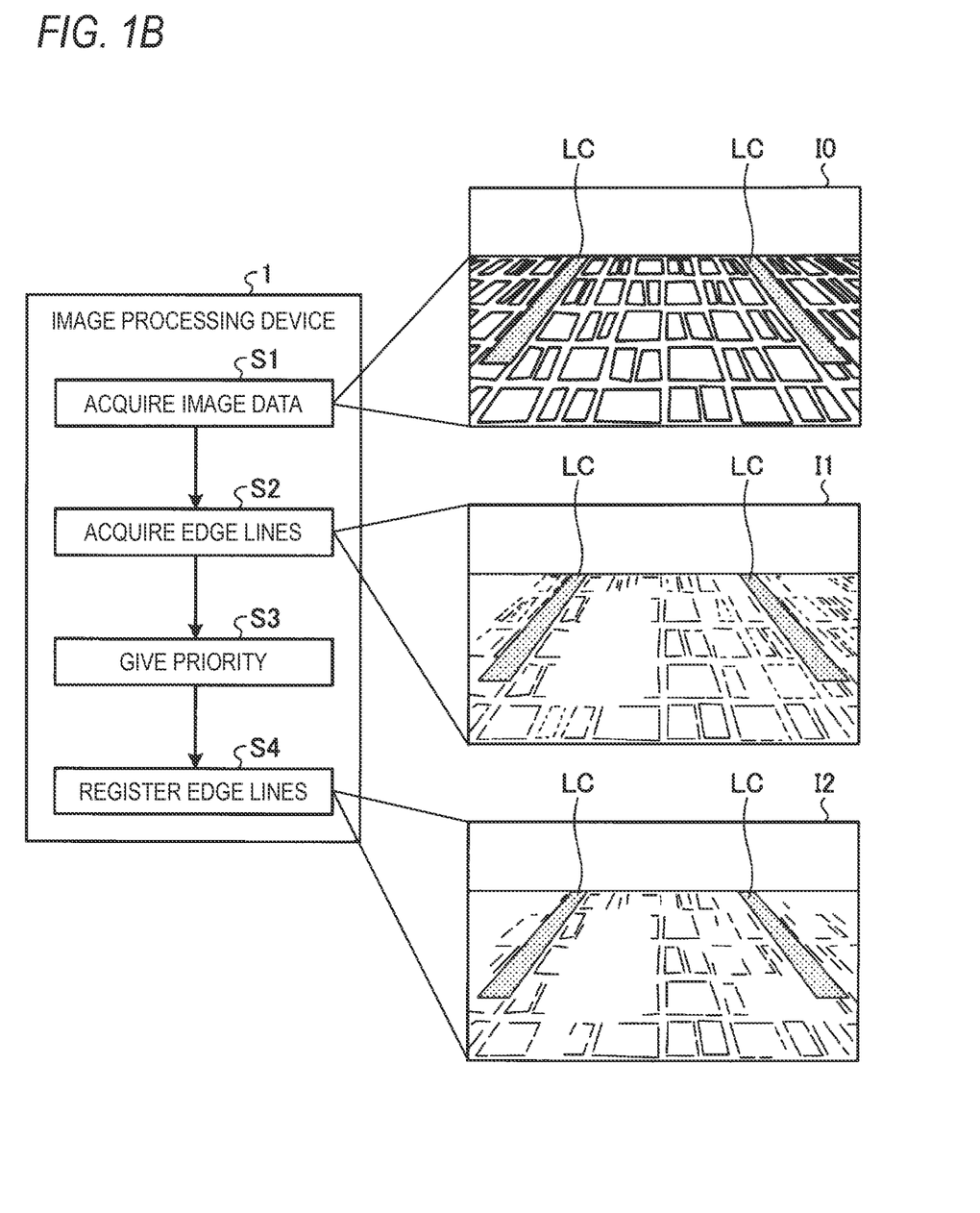
FIG. 1B depicts an outline of an image processing method.

First, an outline of an image processing device 1 in accordance with a first exemplary embodiment is described with reference to FIGS. 1A and 1B. FIG. 1A depicts an example in which the image processing device 1 is mounted. Also, FIG. 1B depicts an outline of an image processing method. In the meantime, the image processing method is executed by the image processing device 1 shown in FIGS. 1A and 1B.

As shown in FIG. 1A, the image processing device 1 of the exemplary embodiment is mounted on a vehicle C, and is configured to detect parking spaces PS from captured data captured and obtained by a vehicle-mounted camera 10. The parking space PS is an area between delimiting lines LC such as white lines drawn on a road surface, and is a space in which the vehicle C is to be parked.

The vehicle-mounted camera 10 includes an imaging element such as a CCD (Charge Coupled Device), a CMOS (Complementary Metal Oxide Semiconductor) and the like, for example, and is configured to capture a surrounding of the vehicle C. Also, a lens of the vehicle-mounted camera 10, for which a wide-angle lens such as a fish-eye lens is adopted, for example, has an imaging area R as shown in FIG. 1A.

Meanwhile, in the example of FIG. 1A, the vehicle-mounted camera 10 is a left side camera configured to capture a left side of the vehicle C. However, the vehicle-mounted camera 10 includes a front camera configured to capture a front of the vehicle C, a rear camera configured to capture a rear of the vehicle C, and a right side camera configured to capture a right side of the vehicle C.

When detecting the parking spaces PS, the image processing device 1 detects delimiting lines LC such as white lines drawn on the road surface, based on image data captured and acquired by the vehicle-mounted camera 10. The image processing device 1 is configured to detect the parking spaces PS, based on information about the detected delimiting lines LC.

Specifically, the image processing device 1 is configured to extract edge lines connecting edge points based on luminance of each pixel in the image data. The image processing device 1 is configured to detect a pair of edge lines, which are substantially parallel with each other and have an interval therebetween belonging to a predetermined range corresponding to a width of the delimiting line LC, of the edge lines, as paired edge lines (hereinbelow, referred to as 'delimiting line candidates Lp'). That is, the delimiting line candidates Lp are a pair of edge lines corresponding to left and right ends of the delimiting line LC such as a white line in a width direction.

Then, the image processing device 1 is configured to detect, as the delimiting line LC, two delimiting line candidates Lp arranged in parallel with each other with a predetermined interval. The predetermined interval is a width of a standard parking area for general public defined by laws and the like relating to the parking lot.

Then, the image processing device 1 is configured to detect a parking space PS, based on the two delimiting lines LC. The image processing device 1 is configured to detect a space between the inner edges lines of the delimiting lines LC, as a parking space PS in which the vehicle C can be actually parked.

However, when the delimiting lines LC are drawn on a road surface having many patterns, such as cobbles, there are many edge lines such as boundaries of blocks of cobbles, so that processing time may be prolonged when detecting the edge lines corresponding to boundaries between the delimiting lines LC and the road surface. That is, detection time of the parking space PS may be prolonged.

Therefore, the image processing device 1 of the exemplary embodiment is configured to limit a number of registration of edge lines, which are to be used when extracting the delimiting line candidates Lp, to an upper limit or smaller of the number of registration, thereby suppressing the number of registration of the edge lines. Thereby, the image processing device 1 of the exemplary embodiment can shorten the detection time of the parking space PS.

Specifically, as shown in FIG. 1B, the image processing device 1 acquires first image data I0 by capturing the road surface with the vehicle-mounted camera 10 (S1). Here, it is assumed that the delimiting lines LC are drawn on the road surface on which cobbles are laid.

Then, the image processing device 1 extracts edge lines from the image data I0 (S2). As the edge lines, edge lines connecting edge points of which a luminance difference between adjacent pixels is greater than a first predetermined strength value, which is preset, are extracted.

In the meantime, due to a color of the block of cobbles, a shadow of a building, a shining state of light and the like, edge points along outer peripheries of the cobbles are not extracted, so that a part of a contour of the block of cobbles may not be extracted as the edge line. For this reason, for example, as the edge lines corresponding to the image data I0, edge lines are extracted as shown in image data I1.

The image processing device 1 gives priorities to the extracted edge lines (S3). Specifically, the image processing device 1 ranks the extracted edge lines, based on indexes of the edge line, and gives priorities to the extracted edge lines. The indexes of the edge line include a length of the edge line, a strength of the edge line, a distance from the vehicle-mounted camera 10, a direction of the edge line, and the like.

The length of the edge line is the number of pixels configuring the edge line. The edge strength is an amount of variation in luminance value between adjacent pixels, i.e., a magnitude of a gradient of luminance values, and increases as the amount of variation increases. The edge strength of the edge line is, for example, an average value of the edge strengths of the pixels configuring the edge line.

The delimiting line LC such as a white line has a long length and a large luminance difference from the road surface. For this reason, here, as the index of the edge line for detecting the delimiting line LC, the length of the edge line and the edge strength of the edge line are used. In particular, there is a high possibility that the edge line having a long length is an edge line corresponding to the delimiting line LC. Therefore, the priority of the length of the edge line of the indexes of the edge line is set higher than the priority of the other index, specifically, the edge strength of the edge line. That is, the image processing device 1 sets a weighted value for the length of the edge line to be greater than a weighted value for the other index, and gives the priority to the edge line.

The image processing device 1 registers the edge lines, based on the given priorities (S4). The image processing device 1 registers the edge lines while limiting the number of registration of the edge lines to the preset upper limit or smaller of the number of registration. Specifically, the image processing device 1 registers the edge lines in descending order of rank, and ends the registration of the edge lines when the number of registration reaches the upper limit of the number of registration.

Thereby, edge lines indicated in image data I2 are registered, with respect to the edge lines indicated in the image data I1. Comparing the image data I1 and the image data I2, it can be seen that edge lines of which the length of the edge line is short are deleted in the image data I2.

In this way, the image processing device 1 gives priorities to the extracted edge lines, and registers the edge lines having higher priorities while limiting the number of registration of the edge lines to the upper limit or smaller of the number of registration. Thereby, the image processing device 1 can execute processing of detecting the parking space PS in a state in which the edge lines, which have a high possibility that they do not correspond to the delimiting line LC, have been deleted. Therefore, the image processing device 1 can shorten the detection time of the parking space PS.

Figure 2:
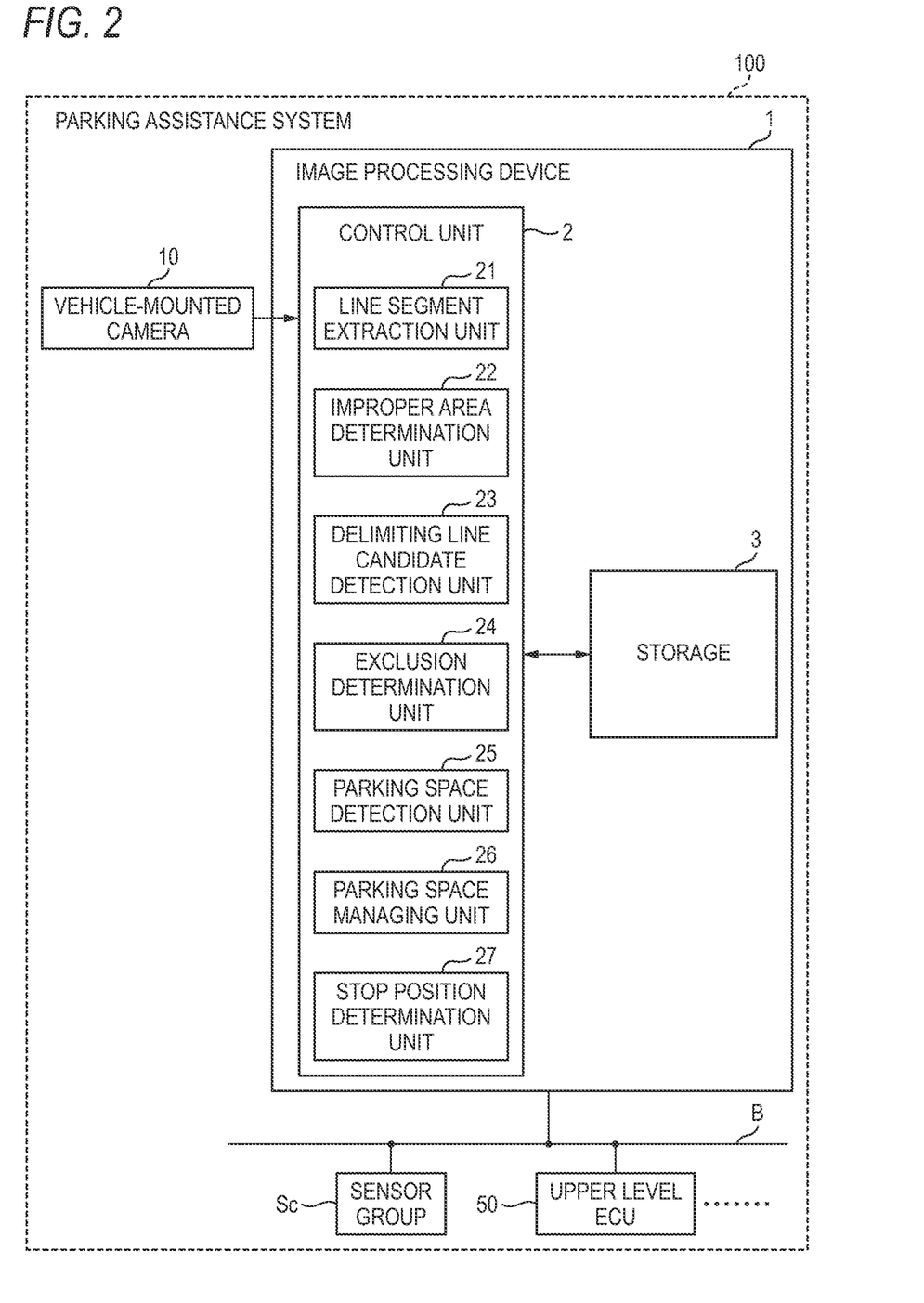
FIG. 2 is a block diagram of the image processing device.

Subsequently, a configuration example of the image processing device 1 of the exemplary embodiment is described with reference to FIG. 2. FIG. 2 is a block diagram of the image processing device 1. FIG. 2 depicts a parking assistance system 100 including the image processing device 1. As shown in FIG. 2, the parking assistance system 100 includes the image processing device 1, the vehicle-mounted camera 10, a sensor group Sc, and an upper level ECU (Electronic Control Unit) 50. Also, as shown in FIG. 2, the image processing device 1, the sensor group Sc, the upper level ECU 50 can perform communication with each other via a communication bus B of communication protocols of CAN (Control Area Network) communication.

The sensor group Sc includes a variety of sensors configured to detect a traveling state of the vehicle C, and is configured to notify detected sensor values to the image processing device 1. The sensor group Sc includes a vehicle speed sensor configured to detect the number of rotations of a wheel of the vehicle C, a steering angle sensor configured to detect a steering angle of the vehicle C, and the like.

The upper level ECU 50 is an ECU configured to support automatic parking of the vehicle C, for example, and is configured to park the vehicle C, based on the parking space PS detected by the image processing device 1, for example. For example, the upper level ECU 50 is an EPS (Electric Power Steering)-ECU configured to control the steering angle of the vehicle C, and can control the steering angle relative to the parking space PS detected by the image processing device 1. In the meantime, the upper level ECU 50 may include an ECU configured to perform accelerator control and brake control.

As shown in FIG. 2, the image processing device 1 includes a control unit 2 and a storage 3. The control unit 2 includes a line segment extraction unit 21, an improper area determination unit 22, a delimiting line candidate detection unit 23, an exclusion determination unit 24, a parking space detection unit 25 (an example of a detection unit), a parking space managing unit 26, and a stop position determination unit 27.

The control unit 2 includes a computer having, for example, a CPU (Central Processing Unit), a ROM (Read Only Memory), a RAM (Random Access Memory), an HDD (Hard Disk Drive), an I/O port, and the like, and a variety of circuits.

The CPU of the computer is configured to read and execute programs stored in the ROM, thereby functioning as the line segment extraction unit 21, the improper area determination unit 22, the delimiting line candidate detection unit 23, the exclusion determination unit 24, the parking space detection unit 25, the parking space managing unit 26 and the stop position determination unit 27 of the control unit 2.

Also, at least some or all of the line segment extraction unit 21, the improper area determination unit 22, the delimiting line candidate detection unit 23, the exclusion determination unit 24, the parking space detection unit 25, the parking space managing unit 26 and the stop position determination unit 27 of the control unit 2 may be configured by hardware such as an ASIC (Application Specific Integrated Circuit), an FPGA (Field Programmable Gate Array) and the like.

Also, the storage 3 corresponds to a RAM and an HDD, for example. The RAM and the HDD can store therein a variety of information and information of diverse programs. In the meantime, the image processing device 1 may be configured to acquire the programs and diverse information through another computer connected with a wired or wireless network, or a portable recording medium.

When it is assumed that the vehicle C travels in a parking lot (for example, the vehicle speed is lower than 30 km/h), for example, the control unit 2 may execute detection processing of the parking space PS or may execute the detection processing all during the traveling of the vehicle C.

The line segment extraction unit 21 is configured to extract edge points based on luminance of each pixel from the image data input from the vehicle-mounted camera 10, to extract edge lines connecting the edge points, and to register edge lines, which are used so as to detect the parking space PS. The line segment extraction unit 21 will be described in detail later.

The line segment extraction unit 21 is configured to notify information about the edge points and edge lines to the improper area determination unit 22.

The improper area determination unit 22 is configured to determine whether there is an improper area in which it is difficult to detect the delimiting line L for delimiting the parking space PS, based on the edge points and the edge lines. For example, the improper area determination unit 22 may determine, as the improper area, a non-paved road surface area (for example, gravels) and a grating area, in which more edge points are extracted, as compared to a paved road surface.

Specifically, the improper area determination unit 22 may determine, as the improper area, an area in which a density of the respective edge points is equal to or greater than a preset predetermined density and the luminance gradient of the respective edge points is not uniform. The improper area determination unit 22 is configured to remove edge information about the improper area from the edge information, based on the determined improper area, and to provide the resultant information to later processing.

The delimiting line candidate detection unit 23 is configured to detect the delimiting line candidates Lp, which are candidates of the delimiting line L for delimiting the parking space PS, based on the edge lines registered by the line segment extraction unit 21. The delimiting line candidate detection unit 23 is configured to generate delimiting line information about the detected delimiting line candidates Lp and to notify the same to the exclusion determination unit 24.

In the meantime, the delimiting line candidate detection unit 23 may execute the detection processing of the delimiting line candidates Lp, except the improper area detected by the improper area determination unit 22. In other words, the delimiting line candidate detection unit 23 does not execute the detection processing of the delimiting line candidates Lc for the improper area. Thereby, it is possible to suppress a processing load of the control unit 2.

The exclusion determination unit 24 is configured to determine whether there is a parking-unavailable area in which the parking of the vehicle C is not permitted, based on the delimiting line candidates Lp detected by the delimiting line candidate detection unit 23. For example, the exclusion determination unit 24 determines whether there is a parking-unavailable area such as a stripe area, as the parking-unavailable area.

Specifically, in a case in which the delimiting line candidates substantially parallel with each other are assumed as delimiting lines LC, an area between the assumed delimiting lines LC is determined as a parking-unavailable area, when three or more delimiting line candidates Lp inclined to the assumed delimiting lines LC are provided with predetermined intervals.

Also, the exclusion determination unit 24 may determine whether there is a delimiting line candidate Lp, which is not necessary to detect the parking space such as a road surface marker. For example, the exclusion determination unit 24 may detect each road surface marker included in the image data by matching the delimiting line candidates Lc detected by the delimiting line candidate detection unit 23 and a template model of each road surface marker.

The exclusion determination unit 24 is configured to delete the unnecessary delimiting line candidates Lp from the delimiting line information, to apply the information about the parking-unavailable area to the delimiting line information, and to notify the same to the parking space detection unit 25.

The parking space detection unit 25 is configured to detect the delimiting lines LC and the parking space PS, based on the delimiting line candidates Lp detected by the delimiting line candidate detection unit 23.

The parking space detection unit 25 may detect the parking space PS while avoiding the area determined as the parking-unavailable area by the exclusion determination unit 24.

That is, the parking space detection unit 25 may detect the parking space PS while avoiding the stripe area and the like. When the parking space detection unit 25 detects the parking space PS, it notifies parking space information about the parking space PS to the parking space managing unit 26. Also, the parking space information includes vertex coordinates of each delimiting line LC based on the vehicle C.

The parking space managing unit 26 is configured to manage the parking spaces PS detected by the parking space detection unit 25 in chronical order. The parking space managing unit 26 may estimate a moving amount of the vehicle C on the basis of the sensor values input from the sensor group Sc, and estimate the vertex coordinates of each actual delimiting line LC based on past parking space information, based on the moving amount.

Also, the parking space managing unit 26 may update coordinate information of the delimiting line LC in the past parking space information, based on the newly input parking space information. That is, the parking space managing unit 26 is configured to frequently update a relative positional relationship between the vehicle C and the parking space PS, in association with movement of the vehicle C.

Also, the parking space managing unit 26 may set a detection range of the parking space PS while assuming that a plurality of parking spaces PS is continuously arranged. For example, the parking space managing unit 26 sets one parking space PS detected by the parking space detection unit 25, as a reference, and assumes that there is a plurality of parking spaces PS continuously to the parking space PS.

The parking space managing unit 26 is configured to set positions of the assumed parking spaces PS, as a detection range. Thereby, since the line segment extraction unit 21 has only to execute the detection processing of the edge lines only within the detection range set by the parking space managing unit 26, it is possible to suppress the processing load of the control unit 2.

The stop position determination unit 27 is configured to determine a stop position upon parking of the vehicle C in the parking space PS, based on the edge lines registered by the line segment extraction unit 21. For example, the stop position determination unit 27 determines a stop position of the vehicle C by detecting a wheel block, a curbstone, a wall, a white line extending in a vehicle width direction and the like, based on the edge lines registered by the line segment extraction unit 21.

When a wheel block is detected, the stop position determination unit 27 determines a stop position so that rear wheels of the vehicle C are to be located just before the wheel block. When a white line, a wall and the like are detected, instead of the wheel block, the stop position determination unit 27 determines a stop position so that a rear end (for example, a tip end of a rear bumper) of the vehicle C is to be located just before the white line.

Figure 3:
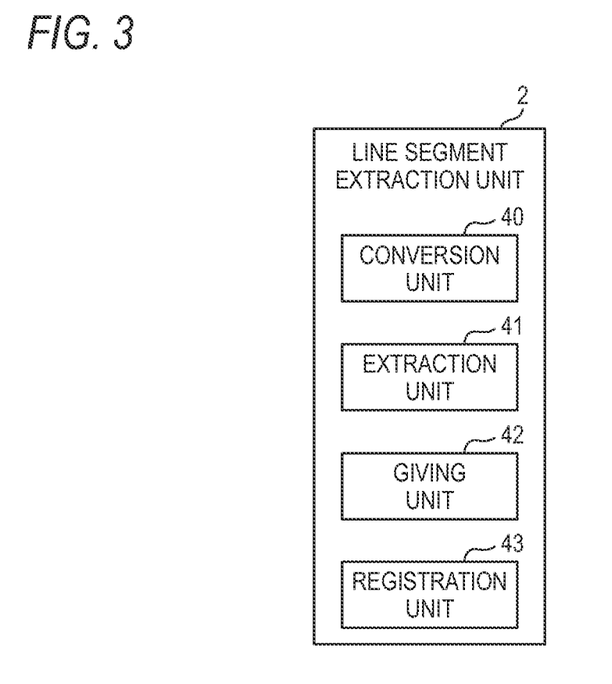
FIG. 3 is a block diagram of a line segment extraction unit.

Subsequently, the line segment extraction unit 21 is described with reference to FIG. 3. FIG. 3 is a block diagram of the line segment extraction unit 21.

The line segment extraction unit 21 includes a conversion unit 40, an extraction unit 41, a giving unit 42, and a registration unit 43.

The conversion unit 40 is configured to perform gray scale processing for the image data input from the vehicle-mounted camera 10, thereby converting the image data input from the vehicle-mounted camera 10 into gray scale image data. The gray scale processing is processing of converting each pixel of image data so as to express the same with each gradation (for example, 256 gradations) from white to black, in correspondence to luminance.

The extraction unit 41 is configured to extract the edge lines, based on the gray scale image data. Specifically, the extraction unit 41 calculates an edge strength of each pixel and a luminance gradient by applying a Sobel filter to the gray scale image data, for example. The extraction unit 41 extracts the edge points by extracting pixels having edge strengths exceeding a first predetermined strength value. The extraction unit 41 extracts the edge lines by connecting the adjacent edge points.

Thereby, for example, even in a parking lot in which the delimiting lines LC are drawn on the road surface of cobbles, the edge lines are not extracted from blocks of light-colored cobbles. For this reason, as shown in FIG. 1B, the edge lines of the image data I1 are extracted, with respect to the image data I0 captured and obtained by the vehicle-mounted camera 10.

The extraction unit 41 is configured to extract the edge lines from the gray scale image data, in order from a side closer to the vehicle C.

The giving unit 42 is configured to give priorities to the edge lines extracted by the extraction unit 41. When the edge lines are extracted by the extraction unit 41, the giving unit 42 gives priorities to the extracted edge lines. The giving unit 42 gives priorities to the extracted edge lines whenever the edge lines are extracted. That is, while extracting the edge lines by the extraction unit 41, the line segment extraction unit 21 gives priorities to the extracted edge lines by the giving unit 42, and associates the edge lines and the priorities each other.

The giving unit 42 is configured to give ranks to the edge lines, as the priority. The rank is given on the basis of the indexes of the edge line. The indexes of the edge line are the length of the edge line and the edge strength of the edge line.

Specifically, the giving unit 42 classifies the edge lines into four ranks, based on the length of the edge line and the edge strength of the edge line. The four ranks are rank 3 to rank 0. In the meantime, the number of ranks is not limited thereto.

Figure 4:
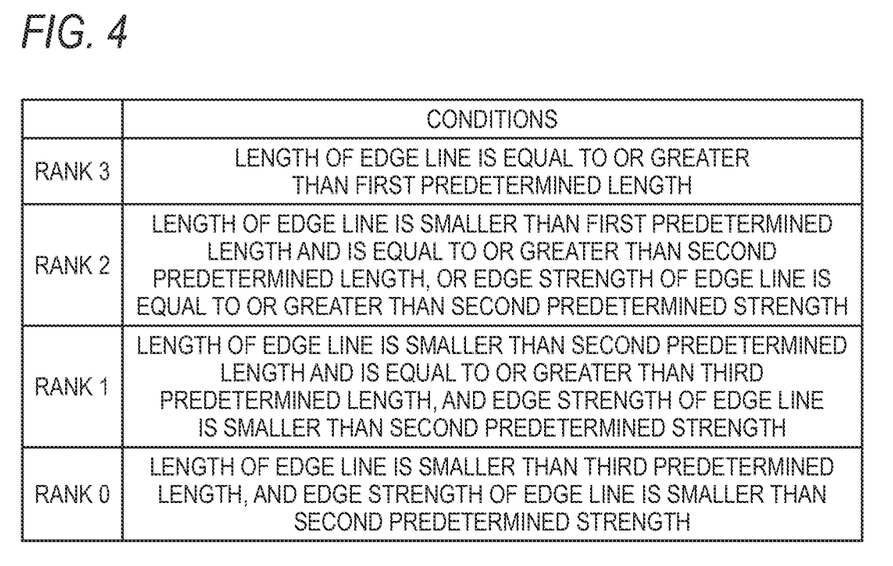
FIG. 4 depicts conditions of respective ranks.

Here, conditions of the respective ranks are shown in FIG. 4. FIG. 4 depicts conditions of the respective ranks.

An edge line of rank 3 is an edge line satisfying a first condition. Specifically, the edge line of rank 3 is an edge line of which a length of the edge line is equal to or greater than a first predetermined length. The first predetermined length is a preset length, and is, for example, 20 pixels. Meanwhile, in rank 3, the edge strength of the edge line is not considered. That is, rank 3 is a rank having only the length of the edge line, as the index.

An edge line of rank 2 is an edge line satisfying a second condition. Specifically, the edge line of rank 2 is an edge line of which a length of the edge line is smaller than the first predetermined length and is equal to or greater than a second predetermined length or an edge line of which an edge strength of the edge line is equal to or greater than a second predetermined strength. The second predetermined length is a preset length, and is a length shorter than the first predetermined length. The second predetermined length is, for example, 15 pixels. Also, the second predetermined strength is a preset edge strength, and is greater than the first predetermined strength.

An edge line of rank 1 is an edge line satisfying a third condition. Specifically, the edge line of rank 1 is an edge line of which a length of the edge line is smaller than the second predetermined length and is equal to or greater than a third predetermined length and an edge strength of the edge line is smaller than the second predetermined strength. The third predetermined length is a preset length, and is a length shorter than the second predetermined length. The third predetermined length is, for example, 10 pixels.

An edge line of rank 0 is an edge line of which a length of the edge line is smaller than the third predetermined length and an edge strength of the edge line is smaller than the second predetermined strength.

Rank 3 to rank 0 have priorities that become higher from rank 0 toward rank 3. In the ranks, an edge line of which a length of the edge line is equal to or greater than the first predetermined length is given with rank 3 having the highest priority, irrespective of the edge strength of the edge line. That is, the giving unit 42 sets a weighted value for the length of the edge line of the indexes of the edge line to be greater than a weighted value for the other index, specifically, the index of the edge strength of the edge line, and gives the priority.

Here, the greater the rank number is, the higher the priority is. However, a configuration is also possible in which the smaller the rank number is, the higher the priority is. For example, an edge line of which a length of the edge line is equal to or greater than the first predetermined length may be given with rank 0, and an edge line of which a length of the edge line is smaller than the third predetermined length and an edge strength of the edge line is smaller than the second predetermined strength may be given with rank 3.

Also, the first predetermined length to the third predetermined length, which are conditions of the length of the edge line, may be appropriately set, in correspondence to a resolution of the vehicle-mounted camera 10. Specifically, as the resolution of the vehicle-mounted camera 10 increases, the first predetermined length to the third predetermined length increase.

The giving unit 42 is configured to determine whether the extracted edge lines satisfy the first condition to the third condition, and to give a rank satisfying the condition, as the priority. In the meantime, the giving unit 42 is configured to give a rank of an upper level to an edge line satisfying the plurality of rank conditions.

The registration unit 43 is configured to tentatively register the edge line to which the priority is given. Specifically, the registration unit 43 stores, in the storage 3, information about the edge lines associated with the priorities.

Also, the registration unit 43 is configured to limit the number of registration of the edge lines to the upper limit or smaller of the number of registration, based on the priority of each edge line, and to definitely register the edge lines. Specifically, the registration unit 43 stores the information about the edge lines in the storage 3, in descending order of the priority, based on the priorities of the edge lines tentatively registered. In the meantime, for the edge lines to be definitely registered, the registration unit 43 may release the association of the priorities, and store only the information about the edge lines.

The registration unit 43 is configured to definitely register the edge lines in descending order of the priority, and ends the registration of the edge lines when the number of registration of the edge lines reaches the upper limit of the number of registration.

Specifically, the registration unit 43 first definitely registers the edge lines of rank 3. The registration unit 43 ends the definite registration of the edge lines when the number of registration of the edge lines of rank 3 reaches the upper limit of the number of registration. In the meantime, when there is a plurality of edge lines of the same rank 3, the registration unit 43 performs the definite registration in order from an edge line, which is closer to the vehicle-mounted camera 10, of the edge lines of the same rank.

When the registration unit 43 definitely registers all the edge lines of rank 3 and the number of registration is smaller than the upper limit of the number of registration, the registration unit 43 definitely register the edge lines of rank 2. When the number of registration of the edge lines of rank 3 and rank 2 reaches the upper limit of the number of registration, the registration unit 43 ends the definite registration of the edge lines.

When the registration unit 43 definitely registers all the edge lines of rank 2 and the number of registration is smaller than the upper limit of the number of registration, the registration unit 43 definitely registers the edge lines of rank 1. When the number of registration of the edge lines of rank 3, rank 2 and rank 1 reaches the upper limit of the number of registration, the registration unit 43 ends the definite registration of the edge lines.

Also, when the registration unit 43 definitely registers all the edge lines of rank 1 and the number of registration is smaller than the upper limit of the number of registration, the registration unit 43 definitely registers the edge lines of rank 0. When the number of registration of the edge lines of rank 3, rank 2, rank 1 and rank 0 reaches the upper limit of the number of registration, the registration unit 43 ends the definite registration of the edge lines. In the meantime, when the registration unit 43 definitely registers all the edge lines of rank 0, i.e., when the extracted edge lines are all definitely registered, the definite registration of the edge lines is over.

Thereby, in a case in which the number of edge lines to be detected is large, such as a parking lot provided on a road surface of cobbles, the registration unit 43 excludes the edge lines, which has a low possibility that the edge lines correspond to the delimiting lines LC, thereby limiting the edge lines to be definitely registered. In the meantime, the information of the edge lines tentatively registered in the storage 3 is deleted upon the definite registration or after the definite registration.

Based on the information of the edge lines definitely registered in the storage 3 in this way, processing is executed in the improper area determination unit 22 and the like.

Figure 5:
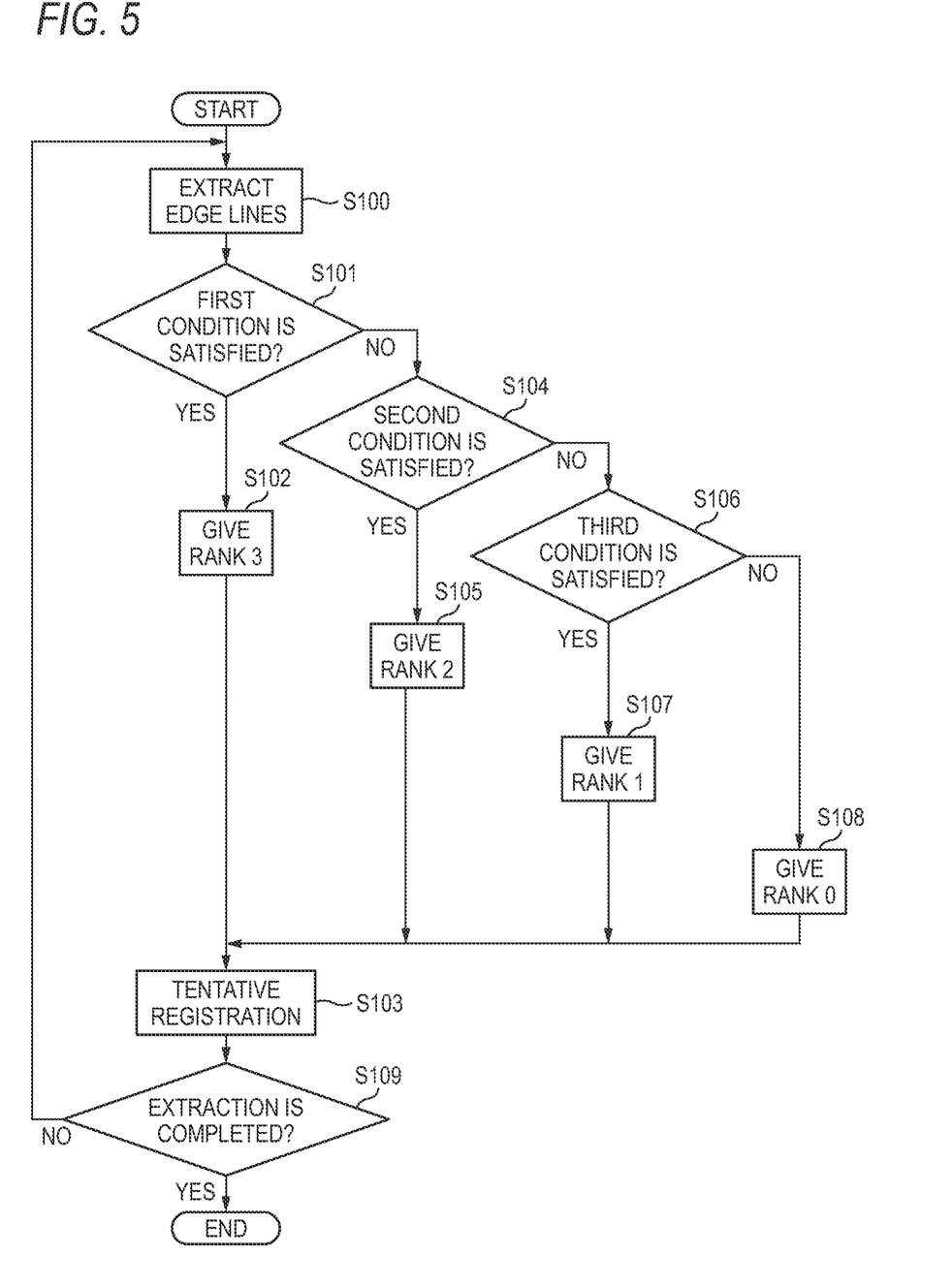
FIG. 5 is a flowchart depicting priority giving processing of a first exemplary embodiment.

Subsequently, priority giving processing of the first exemplary embodiment is described. FIG. 5 is a flowchart depicting the priority giving processing of the first exemplary embodiment.

The image processing device 1 extracts the edge line from the gray scale image data (S100).

The image processing device 1 determines whether the extracted edge line satisfies the first condition (S101). When it is determined that the extracted edge line satisfies the first condition (S101: Yes), the image processing device 1 gives the priority of rank 3 to the extracted edge line (S102), and tentatively registers the edge line (S103).

When it is determined that the extracted edge line does not satisfy the first condition (S101: No), the image processing device 1 determines whether the extracted edge line satisfies the second condition (S104). When it is determined that the extracted edge line satisfies the second condition (S104: Yes), the image processing device 1 gives the priority of rank 2 to the extracted edge line (S105), and tentatively registers the edge line (S103).

When it is determined that the extracted edge line does not satisfy the second condition (S104: No), the image processing device 1 determines whether the extracted edge line satisfies the third condition (S106). When it is determined that the extracted edge line satisfies the third condition (S106: Yes), the image processing device 1 gives the priority of rank 1 to the extracted edge line (S107), and tentatively registers the edge line (S103).

When it is determined that the extracted edge line does not satisfy the third condition (S106: No), the image processing device 1 gives the priority of rank 0 to the extracted edge line (S108), and tentatively registers the edge line (S103).

When it is determined that the extraction of the edge lines from the gray scale image data is completed (S109: Yes), the image processing device 1 ends the current priority giving processing. When it is determined that the extraction of the edge lines from the gray scale image data is not completed (S109: No), the image processing device 1 extracts an edge line to which a rank has not been given (S100).

Figure 6:
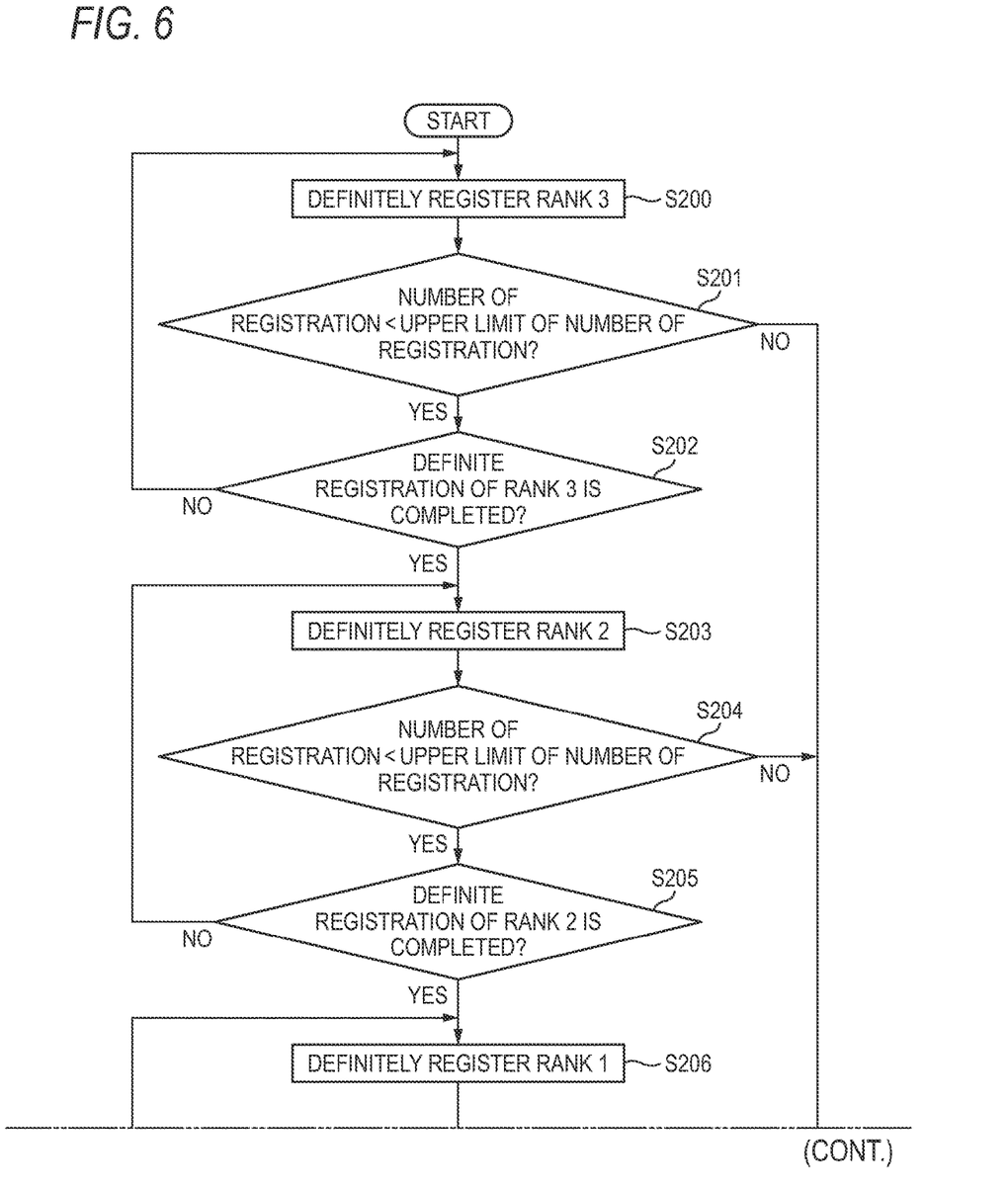
FIG. 6 is a flowchart depicting definite edge line registration processing of the first exemplary embodiment.

Subsequently, definite edge line registration processing of the first exemplary embodiment is described with reference to FIG. 6. FIG. 6 is a flowchart depicting the definite edge line registration processing of the first exemplary embodiment. The definite edge line registration processing is executed after the priority giving processing is over.

In the meantime, the definite edge line registration processing may be executed at the same time with the priority giving processing. For example, the definite edge line registration processing may be started before the priorities are given to all the edge lines of the gray scale image data.

The image processing device 1 definitely registers the edge lines of rank 3, i.e., the edge lines having the highest priority (S200).

The image processing device 1 determines whether the number of registration of the edge lines is smaller than the upper limit of the number of registration (S201). When it is determined that the number of registration of the edge lines is smaller than the upper limit of the number of registration (S201: Yes), the image processing device 1 determines whether the definite registration of the edge lines of rank 3 has been completed (S202).

When it is determined that the definite registration of the edge lines of rank 3 has not been completed (S202: No), the image processing device 1 continues the definite registration of the edge lines of rank 3 (S200). When it is determined that the definite registration of the edge lines of rank 3 has been completed (S202: Yes), the image processing device 1 definitely registers the edge lines of rank 2 (S203).

The image processing device 1 determines whether the number of registration of the edge lines is smaller than the upper limit of the number of registration (S204). When it is determined that the number of registration of the edge lines is smaller than the upper limit of the number of registration (S204: Yes), the image processing device 1 determines whether the definite registration of the edge lines of rank 2 has been completed (S205).

When it is determined that the definite registration of the edge lines of rank 2 has not been completed (S205: No), the image processing device 1 continues the definite registration of the edge lines of rank 2 (S203). When it is determined that the definite registration of the edge lines of rank 2 has been completed (S205: Yes), the image processing device 1 definitely registers the edge lines of rank 1 (S206).

The image processing device 1 determines whether the number of registration of the edge lines is smaller than the upper limit of the number of registration (S207). When it is determined that the number of registration of the edge lines is smaller than the upper limit of the number of registration (S207: Yes), the image processing device 1 determines whether the definite registration of the edge lines of rank 1 has been completed (S208).

When it is determined that the definite registration of the edge lines of rank 1 has not been completed (S208: No), the image processing device 1 continues the definite registration of the edge lines of rank 1 (S209). When it is determined that the definite registration of the edge lines of rank 1 has been completed (S208: Yes), the image processing device 1 definitely registers the edge lines of rank 0 (S209).

The image processing device 1 determines whether the number of registration of the edge lines is smaller than the upper limit of the number of registration (S210). When it is determined that the number of registration of the edge lines is smaller than the upper limit of the number of registration (S210: Yes), the image processing device 1 determines whether the definite registration of the edge lines of rank 0 has been completed (S211).

When it is determined that the definite registration of the edge lines of rank 0 has not been completed (S211: No), the image processing device 1 continues the definite registration of the edge lines of rank 0 (S209).

When it is determined that the number of registration of the edge lines reaches the upper limit of the number of registration (S201, S204, S207, S210: No), the image processing device 1 ends the current definite edge line registration processing. Also, when it is determined that the definite registration of the edge lines of rank 0 has been completed (S211: Yes), i.e., when the edge lines tentatively registered are all definitely registered, the image processing device 1 ends the current definite edge line registration processing.

The image processing device 1 gives priorities to the extracted edge lines, and definitely registers the edge lines in descending order of the priority. Also, the image processing device 1 performs the definite registration while limiting the number of registration of the edge lines to the upper limit of the number of registration.

Thereby, in a parking lot where the delimiting lines LC are drawn on a road surface having many patterns, such as cobbles, when the image processing device 1 extracts the edge lines and definitely registers the edge lines, it is possible to suppress definite registration of edge lines corresponding to boundaries of blocks of the cobbles. That is, the image processing device 1 can suppress the definite registration of edge lines having a low possibility that the edge lines correspond to the delimiting lines LC. For this reason, the image processing device 1 can reduce the processing load when extracting the delimiting lines LC, and shorten the processing time. Therefore, the image processing device 1 can shorten the detection time of the parking space PS.

The image processing device 1 sets the weighted value for the length of the edge line of the indexes of the edge line to be greater than the weighted value for the other index, specifically, the edge strength of the edge line, and gives the priority to the edge line.

Thereby, the image processing device 1 can preferentially definitely register the edge lines having a long length and a high possibility that the edge lines correspond to the delimiting lines LC, so that it is possible to improve the detection accuracy of the delimiting lines LC.

The image processing device 1 gives the ranks to the edge lines, based on the indexes of the edge lines, and definitely register the edge lines in descending order of the rank.

Thereby, the image processing device 1 can reduce the processing load when giving the priorities to the edge lines, and the processing load upon the definite registration. For this reason, the image processing device 1 can shorten the detection time of the parking space PS.

When the image processing device 1 extracts the edge lines, it gives priorities to the extracted edge lines.

Thereby, the image processing device 1 can store the information about the edge lines, which are associated with the priorities upon the tentative registration. For this reason, the image processing device 1 can reduce the number of times of readout of the information about the edge lines, thereby shortening the processing time and the detection time of the parking space PS.

Second Exemplary Embodiment

Subsequently, the image processing device 1 in accordance with a second exemplary embodiment is described. Here, differences from the image processing device 1 of the first exemplary embodiment are described, and the descriptions of the same configurations and processing as the image processing device 1 of the first exemplary embodiment are omitted.

The image processing device 1 of the second exemplary embodiment is different, in terms of the method of giving the priority to the edge line. The giving unit 42 of the image processing device 1 of the second exemplary embodiment is configured to give a score to the edge line, as the priority. The score is given, based on the indexes of the edge line.

Specifically, the giving unit 42 gives points to the length of the edge line and the edge strength of the edge line, and gives a summed value of the points, as the score of the edge line.

The giving unit 42 is configured to give a point within a first predetermined range to the length of the edge line. The first predetermined range is a preset range, and is, for example, 0 to 10. The giving unit 42 is configured to give the point, based on the length of the edge line, and to give the larger point as the length of the edge line is longer.

Also, the giving unit 42 is configured to give a point within a second predetermined range to the edge strength of the edge line. The second predetermined range is a preset range, is a range smaller than the first predetermined range, and is a range of which a maximum value is smaller than the first predetermined range. For example, the second predetermined range is 0 to 5. The giving unit 42 is configured to give the point, based on the edge strength of the edge line, and to give the larger point as the edge strength of the edge line is higher.

In the meantime, the first predetermined range and the second predetermined range are not limited to the above ranges but are set so that the weighted value for the length of the edge line of the indexes of the edge line is greater than the weighted value for the other index, specifically, the index of the edge strength of the edge line. Also, the giving unit 42 may adjust a weighted value for each index by multiplying the point based on the length of the edge line and the point based on the edge strength of the edge line by different coefficients. In this case, a coefficient by which the point based on the length of the edge line is multiplied is greater than a coefficient by which the point based on the edge strength of the edge line is multiplied.

The giving unit 42 is configured to give the point for each index of the edge line, and to give a summed value of the points to each edge line, as the score.

In the meantime, here, the greater the score is, the higher the priority is. However, a configuration is also possible in which the smaller the score is, the higher the priority is. For example, as the length of the edge line increases, the point for the length of the edge line may be set smaller, and as the edge strength of the edge line increases, the point for the edge strength of the edge line may be set smaller.

The registration unit 43 is configured to definitely register the edge lines in descending order of the priority, based on the priorities of the edge lines tentatively registered. Specifically, the registration unit 43 definitely registers the edge lines in descending order according to the scores of the edge lines, and ends the definite registration of the edge lines when the number of registration of the edge lines reaches the upper limit of the number of registration. In the meantime, when there is a plurality of edge lines of the same score, the registration unit 43 performs the definite registration in order from an edge line, which is closer to the vehicle-mounted camera 10, of the edge lines of the same score.

Figure 7:
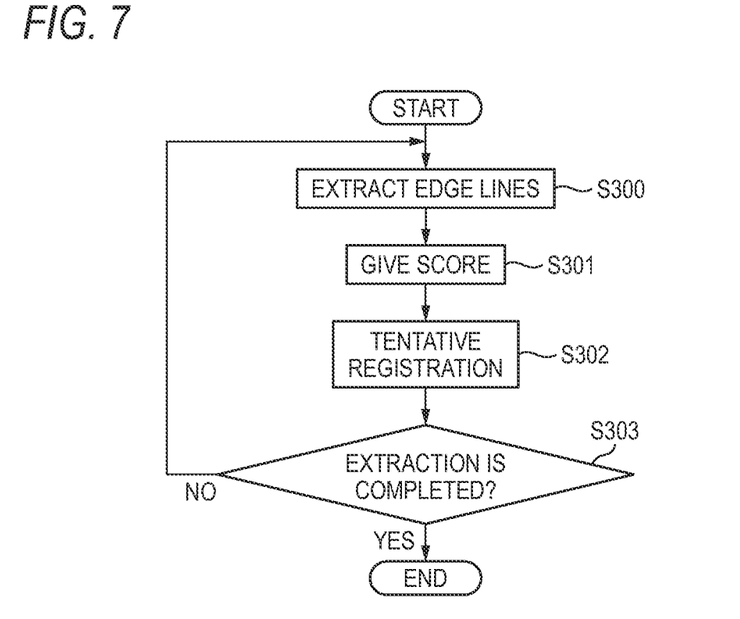
FIG. 7 is a flowchart depicting the priority giving processing of a second exemplary embodiment.

Subsequently, the priority giving processing in accordance with the second exemplary embodiment is described with reference to FIG. 7. FIG. 7 is a flowchart depicting the priority giving processing of the second exemplary embodiment.

The image processing device 1 extracts the edge line from the gray scale image data (S300).

The image processing device 1 gives the points to the extracted edge line, based on the indexes of the edge line, gives the score, which is a summed value of the points, as the priority (S301), and tentatively registers the edge line (S302).

When it is determined that the extraction of the edge lines from the gray scale image data is completed (S303: Yes), the image processing device 1 ends the current priority giving processing. When it is determined that the extraction of the edge lines from the gray scale image data is not completed (S303: No), the image processing device 1 extracts an edge line to which a score has not been given (S300).

Figure 8:
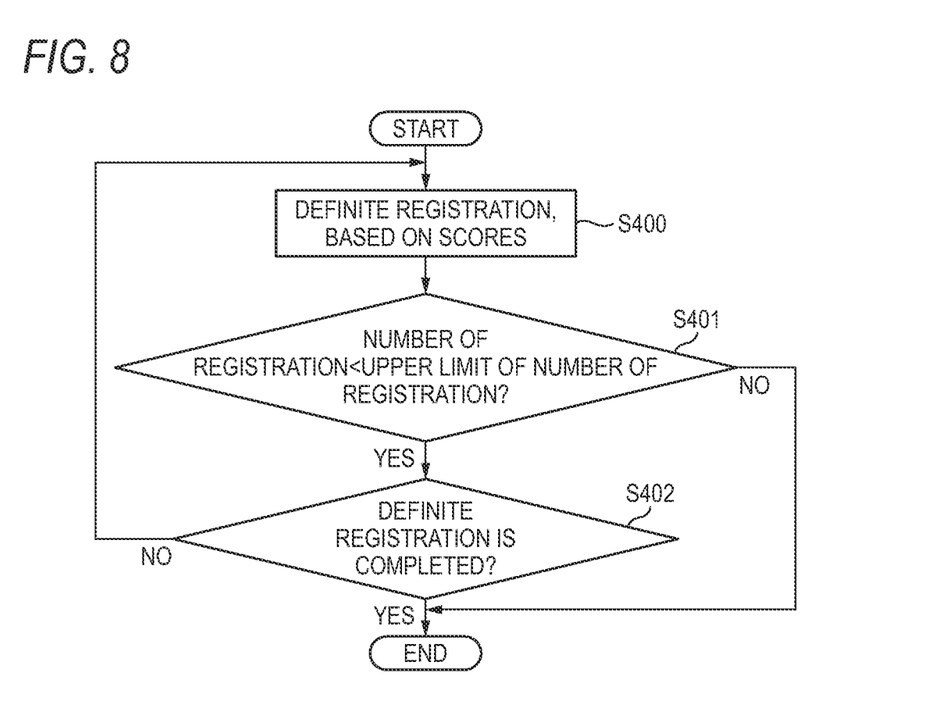
FIG. 8 is a flowchart depicting the definite edge line registration processing of the second exemplary embodiment.

Subsequently, the definite edge line registration processing of the second exemplary embodiment is described with reference to FIG. 8. FIG. 8 is a flowchart depicting the definite edge line registration processing of the second exemplary embodiment.

The image processing device 1 definitely registers the edge lines tentatively registered, based on the scores of the edge lines (S400).

The image processing device 1 determines whether the number of registration of the edge lines reaches the upper limit of the number of registration (S401). When it is determined that the number of registration of the edge lines is smaller than the upper limit of the number of registration (S401: Yes), the image processing device 1 determines whether the definite registration of the edge lines is completed (S402).

When it is determined that the definite registration of the edge lines is not completed (S402: No), the image processing device 1 continues to perform the definite registration of the edge lines (S400).

When it is determined that the number of registration of the edge lines reaches the upper limit of the number of registration (S401: No), the image processing device 1 ends the current definite edge line registration processing. Also, when it is determined that the definite registration of the edge lines is completed (S402: Yes), i.e., when it is determined that the edge lines tentatively registered are all definitely registered, the image processing device 1 ends the current definite edge line registration processing.

The image processing device 1 gives the points for the indexes, based on the indexes of the edge line, and gives the score, which is a summed value of the points for the respective indexes, to the edge line. Then, the image processing device 1 definitely registers the edge lines in descending order according to the scores of the edge lines.

Thereby, the image processing device 1 can give the correct priority to the edge line, in correspondence to the indexes of the edge line. For this reason, even when there is a plurality of edge lines having the same length, for example, the image processing device 1 can preferentially definitely register the edge line having a long length. Therefore, the image processing device 1 can improve the detection accuracy of the delimiting line LC.

Modified Embodiments

Subsequently, the image processing device 1 in accordance with a modified embodiment is described.

When the image processing device 1 of the modified embodiment extracts the edge line from the gray scale image data, it tentatively registers the extracted edge line without giving the priority. After the extraction of the edge lines from the gray scale image data is completed, the image processing device 1 of the modified embodiment gives the priority to each of the edge lines tentatively registered.

Thereby, the image processing device 1 of the modified embodiment can achieve the same effects as the exemplary embodiments.

In the meantime, the image processing device 1 of the modified embodiment may start to give the priority to each of the edge lines tentatively registered, before the extraction of the edge lines from the gray scale image data is completed.

The additional effects and modified embodiments can be easily deduced by one skilled in the art. For this reason, the wider aspect of the present disclosure is not limited to the specific details and exemplary embodiments as described above. Therefore, a variety of changes can be made without departing from the spirit and scope of the concept of the general invention defined by the claims and equivalents thereof

What is claimed is:

1. An image processing device comprising:
   an extraction unit configured to extract at least one edge line based on image data obtained by an imaging device configured to capture a surrounding of a vehicle;
   a giving unit configured to give a priority to each of the at least one edge line;
   a registration unit configured to register the at least one edge line in descending order of the priority while limiting a number of registration of the at least one edge line to an upper limit or smaller of the number of registration; and
   a detection unit configured to detect a parking space, based on the at least one edge line registered.

2. The image processing device according to claim 1, wherein
   the giving unit is configured to give the priority to the at least one edge line based on indexes of the at least one edge line in such a way that a length of the at least one edge line is weighted relative to another index of the at least one edge line.

3. The image processing device according to claim 2, wherein
   the giving unit is configured to give a rank, as the priority, to the at least one edge line based on the indexes of the at least one edge line, and
   the registration unit is configured to register the at least one edge line based on the rank.

4. The image processing device according to claim 3, wherein
   the giving unit gives the priority to the at least one edge line when the at least one edge line is extracted by the extraction unit.

5. The image processing device according to claim 2, wherein
   the giving unit is configured to give points for each of the indexes of the at least one edge line, and to give a score which is a summed value of the points relating to the at least one edge line, as the priority, to each of the at least one edge line, and
   the registration unit is configured to register the edge lines based on the score.

6. The image processing device according to claim 5, wherein
   the giving unit gives the priority to the at least one edge line when the at least one edge line is extracted by the extraction unit.

7. The image processing device according to claim 5, wherein
   the giving unit gives the priority to the at least one edge line after the extraction unit completes extracting from the image data.

8. The image processing device according to claim 2, wherein
   the giving unit gives the priority to the at least one edge line when the at least one edge line is extracted by the extraction unit.

9. The image processing device according to claim 2, wherein
   the giving unit gives the priority to the at least one edge line after the extraction unit completes extracting from the image data.

10. The image processing device according to claim 3, wherein
    the giving unit gives the priority to the at least one edge line after the extraction unit completes extracting from the image data.

11. The image processing device according to claim 1, wherein
    the giving unit is configured to give a rank, as the priority, to the at least one edge line based on indexes of the at least one edge line, and
    the registration unit is configured to register the at least one edge line based on the rank.

12. The image processing device according to claim 11, wherein
    the giving unit gives the priority to the at least one edge line when the at least one edge line is extracted by the extraction unit.

13. The image processing device according to claim 11, wherein
    the giving unit gives the priority to the at least one edge line after the extraction unit completes extracting from the image data.

14. The image processing device according to claim 1, wherein
    the giving unit is configured to give points for each index of the at least one edge line, and to give a score which is a summed value of the points relating to the at least one edge line, as the priority, to each of the at least one edge line, and
    the registration unit is configured to register the edge lines based on the score.

15. The image processing device according to claim 14, wherein
    the giving unit gives the priority to the at least one edge line when the at least one edge line is extracted by the extraction unit.

16. The image processing device according to claim 14, wherein
    the giving unit gives the priority to the at least one edge line after the extraction unit completes extracting from the image data.

17. The image processing device according to claim 1, wherein
    the giving unit gives the priority to the at least one edge line when the at least one edge line is extracted by the extraction unit.

18. The image processing device according to claim 1, wherein the giving unit gives the priority to the at least one edge line after the extraction unit completes extracting from the image data.

19. An image processing method comprising:
an extraction process of extracting edge lines, based on image data obtained by an imaging device configured to capture a surrounding of a vehicle;
a giving process of giving a priority to each of the edge lines;
a registration process of registering the edge lines in descending order of the priority while limiting a number of registration of the edge lines to an upper limit or smaller of the number of registration, and
a detection process of detecting a parking space, based on the registered edge lines.

* * * * *